United States Patent
Galluscio et al.

(10) Patent No.: US 7,152,231 B1
(45) Date of Patent: Dec. 19, 2006

(54) HIGH SPEED INTERPROCESS COMMUNICATION

(75) Inventors: Anthony P. Galluscio, Indialantic, FL (US); William L. Holt, Coco Beach, FL (US); Douglas M. Dyer, Indialantic, FL (US); Albert T. Montroy, Melbourne, FL (US)

(73) Assignee: Harris-Exigent, Inc., Melbourne, FL (US)

( * ) Notice: Subject to any disclaimer, the term of this patent is extended or adjusted under 35 U.S.C. 154(b) by 0 days.

(21) Appl. No.: 09/431,449

(22) Filed: Nov. 1, 1999

(51) Int. Cl.
*G06F 9/46* (2006.01)

(52) U.S. Cl. ...................... 719/312; 711/104

(58) Field of Classification Search ............... 709/312, 709/313, 314; 710/200; 719/312–314; 711/104
See application file for complete search history.

(56) References Cited

U.S. PATENT DOCUMENTS

| | | | | |
|---|---|---|---|---|
| 5,428,781 A | * | 6/1995 | Duault et al. | 718/102 |
| 5,434,975 A | * | 7/1995 | Allen | 719/312 |
| 5,504,901 A | * | 4/1996 | Peterson | 717/144 |
| 5,652,885 A | * | 7/1997 | Reed et al. | 713/1 |
| 5,797,005 A | * | 8/1998 | Bahls et al. | 719/314 |
| 5,802,341 A | * | 9/1998 | Kline et al. | 711/209 |
| 5,913,058 A | * | 6/1999 | Bonola | 713/2 |
| 5,991,845 A | * | 11/1999 | Bohannon et al. | 710/200 |
| 6,148,377 A | * | 11/2000 | Carter et al. | 711/147 |
| 6,181,707 B1 | * | 1/2001 | Erickson et al. | 370/442 |
| 6,275,912 B1 | * | 8/2001 | Haba | 711/154 |
| 6,442,619 B1 | * | 8/2002 | Ouellette | 709/316 |
| 6,754,666 B1 | * | 6/2004 | Brookler et al. | 707/102 |

OTHER PUBLICATIONS

BEA, "BEA MessageQ Introduction to Message Queuing", May 1997, Version 4.0, Edition 2.0, pp. 1-20.*
Linux, Real-Time Linux, & IPC; *Dr. Dobb's Journal*, Nov. 1999.

* cited by examiner

*Primary Examiner*—William Thomson
*Assistant Examiner*—Phuong N. Hoang
(74) *Attorney, Agent, or Firm*—Sacco & Associates, PA; Robert J. Sacco

(57) ABSTRACT

A method for high speed interprocess communications comprises four steps. Initially, first and second processes can be attached to a message buffer in a shared region of user memory. In addition, each process can have a corresponding message queue. In a preferred embodiment, the attaching step comprises the step of attaching first and second processes to a message buffer in a shared region of user memory exclusive of operating system kernel space. Second, message data from the first process can be accumulated in a location in the message buffer. Third, a memory offset corresponding to the location in the message buffer can be placed in the message queue of the second process. Finally, the accumulated data at the location corresponding to the offset can be used in the second process. Consequently, the accumulated message data is transferred from the first process to the second process with minimal data transfer overhead.

14 Claims, 3 Drawing Sheets

HIGH SPEED INTERPROCESS COMMUNICATION

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of network interprocess communications and more particularly to a system and method for high speed interprocess communications.

2. Description of the Related Art

Interprocess communications (IPC) includes both process synchronization and messaging. Messaging, or message passing, can be accomplished using pipes, sockets, or message queues. Pipes provide a byte stream mechanism for transferring data between processes. System calls, for example read and write calls, provide the underlying mechanisms for reading and writing data to a pipe. As the writing process writes to a pipe, bytes are copied from the sending process into a shared data page. Subsequently, when the reading process reads, the bytes are copied out of the shared data page to the destination process. Sending a message using a pipe consumes a minimum of two memory copies moving a total of 2n bytes, where n is the number of bytes in the message. Sockets provide an abstraction mechanism for application programs which can simplify access to communications protocols. Although network communications provide the primary impetus for sockets, sockets may be used for IPC, as well. Still, the transmission of data between processes using a socket can consume time necessary to perform the abstraction overhead, two system calls, for example readv( ) and writev( ), and a minimum of two memory copies moving, in total, 2n bytes. A message queue is an IPC mechanism that is typically managed by an operating system kernel. Typically, the implementation of a message queue is hidden.

Traditional IPC mechanisms can provide IPC between two processes using virtual memory in a shared memory space contained within an operating system kernel. The use of virtual memory implies that, although all processes share the same physical memory space, each process can map a region of the shared memory space differently from other processes. Thus, data residing at one address in the shared memory space can differ physically from the data residing at the same address into the same shared memory space as interpreted by the memory map of a different process.

In traditional IPC, a first process can copy n bytes of data from user memory space into a shared memory space in the operating system kernel. Subsequently, using a system call to the operating system kernel, a second process can copy the same n bytes of data from the shared memory space into the user memory space. Therefore, traditional IPC mechanisms require a minimum overhead of 2n byte copies to communicate n bytes of data between the two processes.

In addition, all methods of traditional IPC require some type of interaction with the operating system kernel. In particular, traditional IPC mechanisms require a minimum of two system calls to the operating system kernel. Moving data in and out of an operating system kernel can include some risk. Specifically, not only must each process move n bytes of data, but each process risks losing CPU control upon invoking the system call required to read or write the data, respectively.

Analogously, computer scientists have recognized the unnecessary expense of passing a message from one process to another. In fact, legacy third-generation programming languages which provide dynamic memory allocation, for example Fortran, inefficiently pass data between processes by copying the data stored in one region of memory, and storing the data in a different region of memory. Subsequently, the recipient function can process the data before returning a copy of the same using the same mechanism. Recognizing the inefficiencies of this type of message passing, computer scientists have adopted pointer passing as an alternative to data passing when messaging a process. In pointer passing, a recipient process receives only an address of a location in memory of the message data. Subsequently, the recipient can manipulate the data at the passed address, in place, without the need for excessive data copies.

Still, in third-generation languages which have adopted pointer passing, for example C or C++, the communicating processes ultimately share one memory mapping of a shared memory space for passing data. In fact, in the absence of a single memory map of shared memory space, present methods of pointer passing become unworkeable because data residing at an address in one memory space is not equivalent to the data residing at the same address in another memory space. Therefore, traditional pointer passing cannot be used to resolve the inefficiencies of traditional IPC in which different processes have different memory maps of a shared region of user memory by virtue of the virtual memory scheme associated with network IPC.

In view of the inefficiencies of traditional IPC, traditional mechanisms for IPC are not suitable for real time command and control systems which can require fail-safe and extremely fast conveyancing of information between processes. For example, copying data can be expensive in terms of processor overhead and time delay. In addition, moving data in and out of an operating system kernel can include some risk. Thus, present IPC mechanisms do not provide the level of service required for real-time applications.

SUMMARY OF THE INVENTION

In a preferred embodiment, a method for high speed interprocess communications can comprise four steps. Initially, first and second processes can be attached to a message buffer in a shared region of user memory (RAM). Moreover, message lists corresponding to each of the processes can be established in the shared region. In particular, the attaching step can comprise the steps of: detecting a previously created shared region of user RAM; if a shared region of RAM is not detected, creating and configuring a shared region of user memory for storing accumulated data; and, attaching to the created and configured shared region of RAM. In a preferred embodiment, the attaching step comprises the step of attaching the first and second processes to a message buffer in a shared region of RAM exclusive of operating system kernel space. Message data from the first process can be accumulated in a location in the message buffer.

Advantageously, the message list can be implemented as a message queue using the common data structure, "queue". As a result, subsequent to the accumulating step, a memory offset corresponding to the location in the message buffer can be added to the message queue of the second process. The adding step can comprise the steps of: retrieving a memory offset in the message buffer corresponding to the location of message data accumulated by the first process; and, inserting the memory offset in the message queue corresponding to the second process. Moreover, the inserting step can comprise the step of atomically assigning the memory offset to an integer location in the message queue corresponding to the second process.

Finally, the accumulated message data at the location corresponding to the memory offset can be processed in the second process. The processing step can comprise the steps of: identifying a memory offset in the message list corresponding to the second process; processing in the second process message data stored at a location in the message buffer corresponding to the memory offset; and, releasing the message buffer. Consequently, the accumulated message data is transferred from the first process to the second process with minimal data transfer overhead.

Viewed from a system architecture standpoint, a method for configuring high speed interprocess communications between first and second processes can include several steps. Initially, the method can include disposing a message buffer in a shared region of RAM shared between first and second processes. In particular, the disposing step can comprise the steps of: creating and configuring a message buffer in a shared region of RAM exclusive of operating system kernel space; and, creating a message list in the shared region for each process, whereby the message list can store memory offsets of message data stored in the message buffer.

The inventive method can include the step of accumulating message data from the first process in a location in the message buffer and adding the memory offset to a message list corresponding to the second process. Advantageously, the message list can be implemented as a message queue. In consequence, the adding step can comprise the steps of: retrieving a memory offset in the message buffer, the memory offset corresponding to the location of message data accumulated by the first process; and, inserting the memory offset in the message queue corresponding to the second process. Moreover, the inserting step can comprise the step of atomically assigning the memory offset to an integer location in the message queue corresponding to the second process.

Finally, the method can include processing in the second process the accumulated message data stored in the message buffer at a location corresponding to the memory offset. In particular, the processing step comprises the steps of: identifying a memory offset in the message list corresponding to the second process; using in the second process accumulated message data at a location in the message buffer corresponding to the memory offset; and, releasing the message buffer. Thus, as a result of the inventive method, the accumulated message data can be transferred from the first process to the second process with minimal data transfer overhead.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
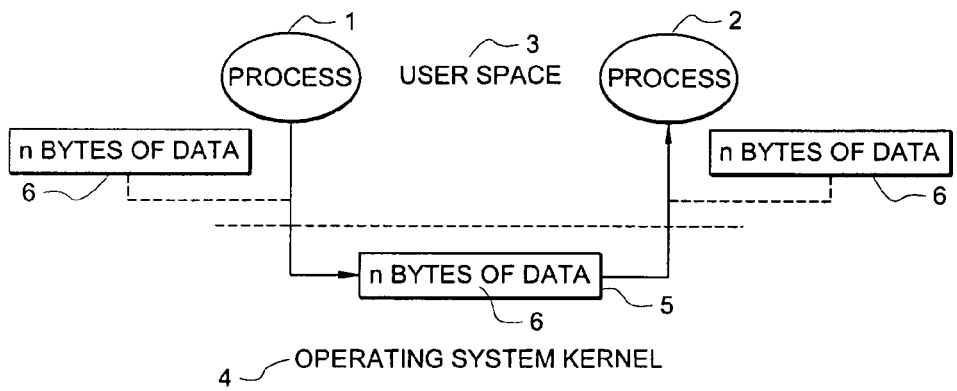
FIG. 1 is a schematic illustration of a traditional IPC architecture.

The traditional interprocess communication (IPC) architecture includes drawbacks which preclude the use of traditional IPC mechanisms in real time command and control systems which can require fail-safe and extremely fast conveyancing of information between processes. FIG. 1 illustrates the commonality between the three traditional mechanisms for IPC. As shown in the figure, two processes 1, 2 communicate using a shared memory space 5 contained within an operating system kernel 4. In particular, process 1 can copy n bytes of data 6 from a user memory space 3 into a shared memory space 5 in the operating system kernel 4. Subsequently, using a system call, process 2 can copy the same n bytes of data 6 from the shared memory space 5 in the operating system kernel 4 into user memory space 3. Therefore, FIG. 1 shows a minimum overhead of two system calls and 2n byte copies to communicate n bytes of data between two processes.

In contrast, a method for high speed IPC can provide extremely fast IPC both by communicating message data in a shared region of random access memory (RAM) external to the operating system kernel and by limiting the movement of the data. Processes are notified of the location of the message data rather than actually receiving a copy of the message data. The recipient process subsequently can read or manipulate (process) the message data in place. As a result, the number of data copies necessary for high speed IPC is minimized. Notably, a method for high speed IPC utilizes a message list in a message buffer for storing a memory offsets set by atomic assignment. Each memory offset can denote a location in the shared region of RAM where a process attached to the shared region can manipulate data stored therein. Specifically, the message list can be implemented using the common data structure, "queue". When one process messages another, the process need only insert a memory offset to the message data in the recipient's message queue.

Figure 2:
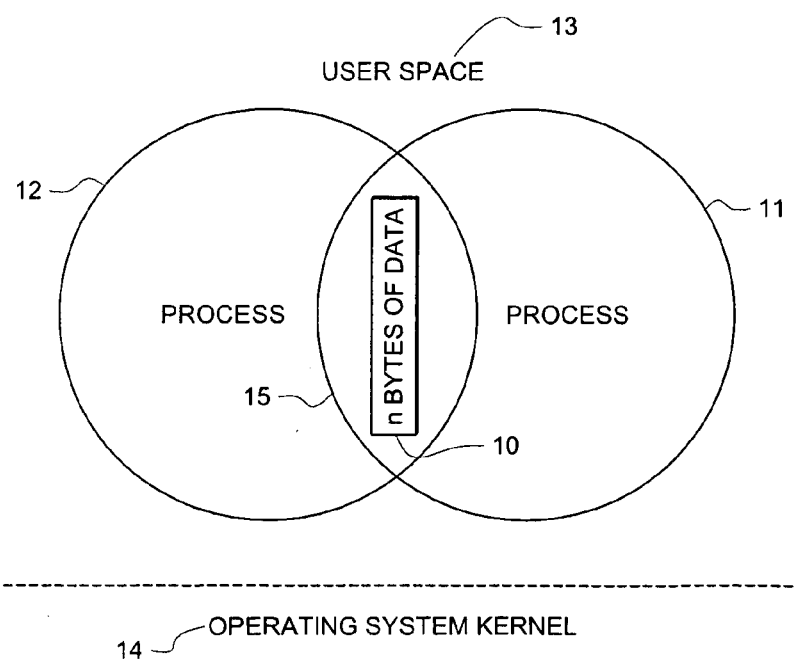
FIG. 2 is a schematic illustration of a high-speed IPC architecture in accordance with the inventive arrangements.

FIG. 2 provides a high-level perspective of the relationships between the message data 10, the operating system kernel 14, and two processes 11, 12 using high speed IPC. From FIG. 2, it will be apparent to one skilled in the art that the message data 10 resides in a shared region of RAM 15 common to both processes 11, 12. Still, one skilled in the art will further recognize that although the shared region of RAM is common to both processes 11, 12, each process 11, 12 can maintain a virtual memory page therein. That is, each process 11, 12 can maintain a different and distinct memory map of the shared region of user RAM 15. However, unlike prior art network IPC where processes do not reconcile differing memory maps of shared RAM, in the preferred embodiment, both processes 11, 12 can reconcile each other's memory mapping into the shared region of RAM 15 by communicating to one another the location of data in the shared RAM relative to a commonly known address.

Capitalizing on this reconciliation, high speed IPC permits the use of the shared region of RAM 15 despite differing memory maps among the processes 11, 12. As a result, in the preferred embodiment, message passing does not require storing message data 10 in operating system kernel space 14. Therefore, in the preferred embodiment, system calls are not required to write and read the data 10. Thus, the elevated risk associated with utilizing operating system kernel space 14 is eliminated. Specifically, the inventive method avoids the risk of a process losing CPU control upon invoking the system call required to read or write the data 10. Hence, the inventive IPC mechanism can provide the level of service required for real-time applications.

Figure 3:
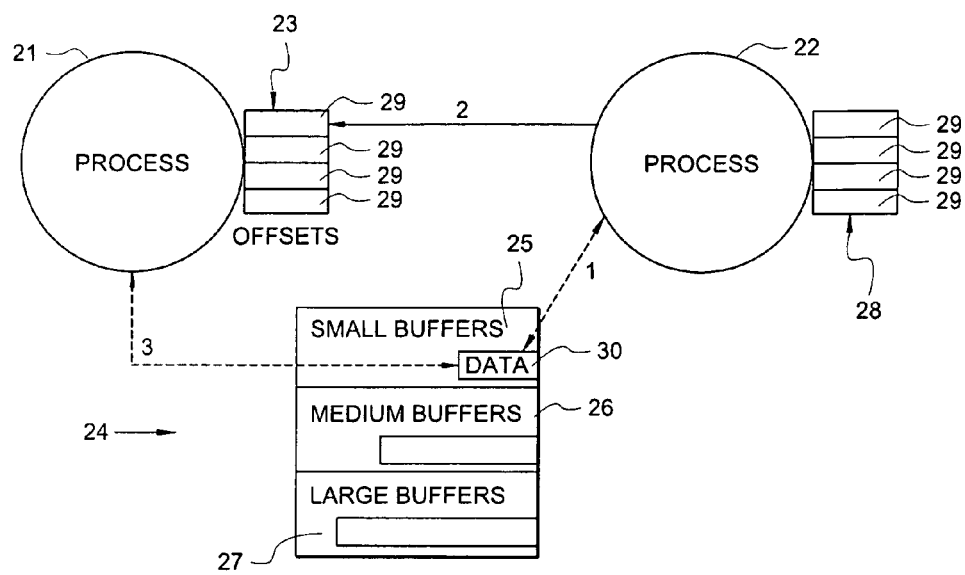
FIG. 3 is a process diagram showing the passing of data using a high-speed IPC architecture in accordance with the inventive arrangements.

FIG. 3 illustrates an exemplary conveyance of data 30 between two processes 21, 22 using the inventive method for high speed IPC. Notwithstanding, the invention is not limited in this regard. Rather, the invention can include more than two processes communicating through a shared message store. The conveyance consists of four essential steps. Initially, a first process 22 and a second process 23 can attach to a small message buffer 25 from a configured pool of message buffers 24 in a shared region of RAM. In the preferred embodiment, the pool of messages buffers 24 can include small 25, medium 26 and large buffers 27. However, the invention is not limited in this regard. Rather, any number or type of message buffers will suffice for operation of the present invention. For instance, a "first-fit" allocation strategy, a "best-fit" strategy, or an "approximate-fit" strategy can also suffice. Still, the preferred combination of all buffers and the management thereof can optimize memory utilization while reducing the cost of memory management.

Figure 4:
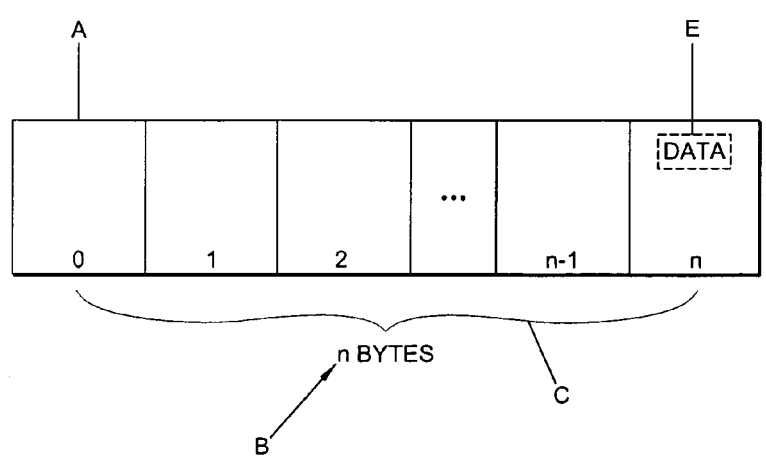
FIG. 4 is a schematic representation of a memory offset.

The first process 22 can accumulate message data 30 in a location in the small message buffer 25. Subsequently, the first process 22 can notify a second process 21 of the location of the data 30 in the small message buffer by adding the location of the data 30 into a message list. Specifically, the first process 22 can insert a memory offset 29 of the message data 30 into a message queue 23 associated with the second process 21. As shown in FIG. 4, a memory offset B represents the number of bytes C from the beginning A of a buffer D, in which data E can be located. In consequence of using memory offsets, rather than absolute addresses (pointers), two processes can reference a single piece of data in a common region of RAM, despite having different memory maps of the memory region. Hence, although the first process 22 and the second process 21 may have differing memory maps of the small message buffer 25, the memory offset 29 can indicate to each process 21, 22 the number of bytes from a common address of the small message buffer 25 in which the message data 30 can be located.

Message queues 23, 28 preferably are created in the shared region of RAM. Each message queue 23, 28 is a list of messages which can be represented by the common data structure, "queue", which, in the preferred embodiment, can handle integer values in a first-in-first-out (FIFO) order. Each message queue 23, 28, alternatively referred to as an "inbox", can contain an administrative area having variables for administering the queue of integer offsets. Those variables may include variables for tracking the position of the front and rear elements of the queue and the queue size.

The first process 22 can access the message queue 23 of the second process 21 by addressing the message queue 23 by name. The first process 22 can either have a priori knowledge of the name of the message queue 23, or the first process 22 can rely on a naming service. Specifically, the first process 22 can cross-reference in a naming service the process identification number corresponding to the second process 21 with the location of the message queue 23 of the second process 21. The naming service can be as simple as a file that contains names of message queues mapped to processes. The naming of message queues can depend on the nature of the specific operating system. For instance, in the Windows NT operating system, the operating system names the message queue. In contrast, the Unix operating system uses integer identifiers to identify a message queue.

The memory offset 29 can be logically inserted in the message queue 23 of the second process 21, but advantageously, because the memory offset 29 can be internally represented as an integer, the memory offset 29 can be physically assigned to a data member in a node in the message queue 23 using a simple integer assignment available, for instance, in the C, C++ or Java programming languages. The mechanism for assignment can vary depending on the implementation of the queue data structure. However, as an example, the first process 22 can calculate the address of the first element in the message queue 23, and can make an atomic assignment of the memory offset 29 to that address.

Specifically, in C-syntax, the physical assignment can consist of "*(inbox_address+front_of_queue)=offset_of_message data". This C-style statement can atomically assign the memory offset 29 of the message data 30 to the address of the first element in message queue 23. The assignment can be atomic in that a single instruction is required, e.g. "newValue=5". In the case of an atomic assignment, the entire integer memory offset 29 can be written to the message queue 23 using the single instruction. The atomic assignment can be contrasted with the case of copying a data message using a memory copy, such as "memcpy", which performs an assignment for each byte in the data message.

The front_of_queue variable can be stored at a predetermined location, as specified by the message queue structure in the beginning of the small message buffer 25. Still, one skilled in the art will recognize that the message queue 23 needn't be stored in the small message buffer 25. Rather, the message queue 23 can be stored in another message buffer, into which access can be provided using any of the traditional IPC techniques. Alternatively and advantageously, access to the message buffer could occur using high speed IPC.

Finally, the second process 21 can identify the memory offset 29 placed in the corresponding message queue 23. Specifically, the second process 21 can poll the message queue 23 waiting for a new memory offset 29 to arrive. Alternatively, the first process 22 can signal the second process 21 that new message data 30 has arrived. Either mechanism can be acceptable depending upon specific application requirements.

Having identified the memory offset 29, the second process 21 can manipulate the accumulated message data 30 in place in the small message buffer 25 corresponding to the memory location denoted by the memory offset 29. The second process 21 can use the accumulated data 30 in accordance with the unique data requirements of the second process 21. When finished, the second process 21 can release the small message buffer 25 using conventional memory management techniques.

Figure 5:
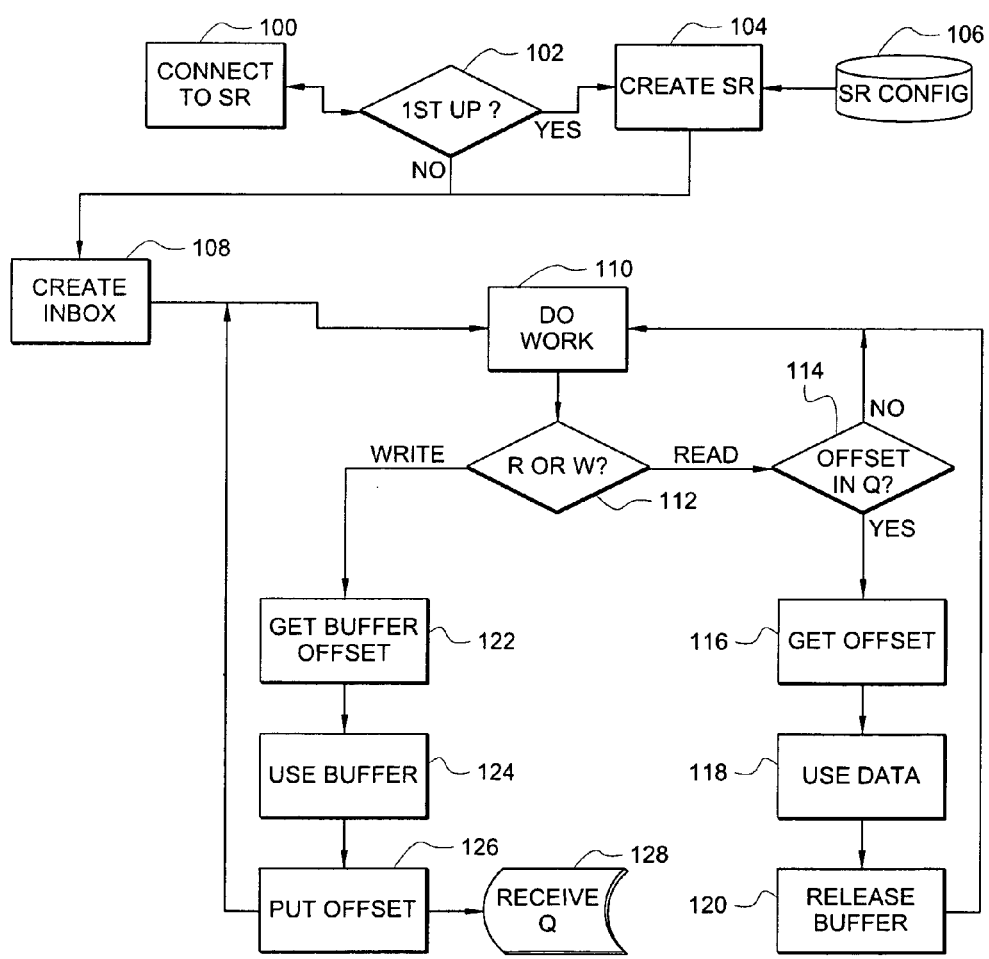
FIG. 5 is a flow chart illustrating an algorithm for high-speed IPC.

FIG. 5 is a flow chart describing a method for high speed IPC. The flow chart depicts a single process which can communicate with another process using the inventive method. As shown in the drawings, the method begins in step 100 where a process can attempt to attach to a message buffer in a shared region of RAM, exclusive of the operating system kernel. One skilled in the art will recognize that each attempt to attach to the message buffer will include moderation by a locking mechanism in order to prevent a logic race condition. One such example of a locking mechanism is a mutex which allows an atomic check and set of a variable that protects a shared region. If one process has the mutex, other processes are blocked from accessing the shared region until the mutex is released.

In decision step 102, if the process is the first activated process in the system, in step 104, a message buffer in the shared region of RAM is created and, in step 106, configured. Preferably, the process creating the shared region of RAM obtains a mutex and releases the mutex only when the shared region is created and configured. The release of the mutex acts as notification to other interested processes that the shared region of RAM is ready for use.

Configuring the shared region of RAM can include naming the shared region, initializing the shared region variables in an administrative area, and sizing the buffer pools. Notably, the shared region may be configured using a stored configuration that is merely retrieved by the process and applied to the shared region.

Whether the process creates and configures a new shared region or attaches to a previously created shared region, in step 108, the process can create a message queue in the shared region corresponding to the process. In particular, the message queue can be used to store incoming memory offsets, placed in the message queue by other processes. Having attached to a message buffer and created a message queue, in step 110, the process can perform normal intraprocess operations until a need for IPC arises, either where the process is a recipient or sender of a message, as determined in decision step 112.

If the process is a first process attempting to transmit data to a second process, the first process, in step 122 can obtain a memory offset to free memory space in the message buffer. One skilled in the art will recognize that obtaining a memory offset to free memory requires the use of a memory management mechanism for allocating buffers in a shared region of user memory. Still, one skilled in the art will futher recognize the widespread availability of memory management mechanisms suitable for accomplishing the same. For example, just as the "malloc( )" function included as part of the ANSI C standard library can abstract the details of memory management, a buffer pool allocator for high speed IPC can abstract the details of managing memory offsets into the message buffer. The buffer pool allocator for high speed IPC can be implemented using techniques well known in the art and thoroughly documented in Kernighan and Ritchie, "The C Programming Language: 2nd Edition", pp. 185–189, incorporated herein by reference.

Subsequently, in step 124, the first process can accumulate message data for the benefit of the second process with the writing beginning at the location corresponding to the memory offset. When finished accumulating the message data in the message buffer, in steps 126 and 128, the first process can place the memory offset in the message queue corresponding to the second process. Significantly, the placement of the memory offset can be an atomic assignment to an integer location in the shared region of RAM. The act of placing the memory offset in the message queue is tantamount to notifying the second process of an attempt at IPC.

Correspondingly, if the process is a second process receiving a request for IPC from a first process, in step 114, the second process can identify a memory offset in the message queue corresponding to the second process. In step 116, the second process can retrieve the memory offset, and in step 118, the second process can use the memory offset to access the data accumulated by the first process at an appropriate location in the message buffer. Significantly, because the accumulated data is stored in a shared region of user memory, it is not necessary for the second process to copy the accumulated data to a different memory space. Rather, in step 120, when finished using the data, the second process need only release the buffer using the above-identified buffer pool allocator.

As illustrated in FIG. 4, the significant differences between the inventive method and traditional IPC mechanisms include the present method's use of a shared region of RAM to store accumulated data. As a result of the use of the shared region, the inventive method does not require operating system calls to write and read accumulated data. In addition, because the present method uses a shared region of RAM instead of a memory region in the operating system kernel, the reconfiguration of the shared region does not require the rebooting of the operating system. Finally, high speed IPC provides a faster and safer mechanism for IPC in that the overhead associated with IPC is minimized from two system calls and 2n bytes of data movement to a minimal n bytes of data movement.

The invention claimed is:

1. A method for high speed interprocess communications comprising the steps of:
    detecting a previously created shared region of RAM;
    if a shared region of RAM is not detected, creating and configuring a shared region of RAM for storing accumulated data;
    attaching first and second processes to a message buffer in the shared region of random access memory (RAM) exclusive of operating system kernel space, each said process having a message list that is a message queue;
    accumulating message data from said first process in a location in said message buffer;
    said first process adding to said message list of said second process a memory offset corresponding to said location in said message buffer; and,
    manipulating in said second process said accumulated data at said location corresponding to said offset,
    whereby said accumulated message data is transferred from said first process to said second process with minimal data transfer overhead.

2. The method according to claim 1, wherein the adding step comprises the steps of:
    retrieving a memory offset in said message buffer corresponding to said location of data accumulated by said first process; and,
    inserting said memory offset in said message queue corresponding to said second process.

3. The method according to claim 2, wherein the inserting step comprises the step of atomically assigning said memory offset to an integer location in said message queue corresponding to said second process.

4. The method according to claim 1, wherein said manipulating step comprises the steps of:
    identifying a memory offset in said message list corresponding to said second process;
    processing in said second process message data stored at a location in said message buffer corresponding to said memory offset; and,
    releasing said message buffer.

5. The method according to claim 1, further comprising the step of locking said accumulated data to prevent said first process from accessing said accumulated data while said accumulated data is being manipulated.

6. A method for configuring high speed interprocess communications between first and second processes comprising the steps of:

creating and configuring a message buffer in a shared region of RAM exclusive of operating system kernel space and shared between said first and second processes;

accumulating message data from said first process in a location in said message buffer;

creating a message list in said shared region of RAM, whereby said message list is a message queue and can store memory offsets of message data stored in said message buffer;

said first process adding to said message list corresponding to said second process a memory offset corresponding to said location in said message buffer; and, manipulating in said second process said accumulated message data stored in said message buffer at a location corresponding to said offset, whereby said accumulated message data is transferred from said first process to said second process with minimal data transfer overhead.

7. The method according to claim 6, wherein the adding step comprises the steps of:

retrieving a memory offset in said message buffer, said memory offset corresponding to said location of said message data accumulated by said first process; and, inserting said memory offset in said message queue corresponding to said second process.

8. The method according to claim 7, wherein the inserting step comprises the step of atomically assigning said memory offset to an integer location in said message queue corresponding to said second process.

9. The method according to claim 6, wherein said manipulating step comprises the steps of:

identifying a memory offset in said message list corresponding to said second process;

processing in said second process said accumulated message data at a location in said message buffer corresponding to said memory offset; and, releasing said message buffer.

10. A computer apparatus programmed with a set of instructions stored in a fixed medium for high speed interprocess communications, said programmed computer apparatus comprising:

means for detecting a previously created shared region of RAM;

means for creating and configuring a shared region in RAM for storing accumulated data if a previously created shared region of RAM is not detected by said detecting means;

means for attaching first and second processes to a message buffer in the shared region of random access memory (RAM) exclusive of operating system kernel space, each said process having a message list that is a message queue;

means for accumulating message data from said first process in a location in said message buffer;

means for said first process to add to said message list of said second process a memory offset corresponding to said location in said message buffer; and, means for manipulating in said second process said accumulated data at said location corresponding to said offset.

11. The computer apparatus according to claim 10, wherein the adding means comprises:

means for retrieving a memory offset in said message buffer corresponding to said location of data accumulated by said first process; and, means for inserting said memory offset in said message queue corresponding to said second process.

12. The computer apparatus according to claim 11, wherein the inserting means comprises means for atomically assigning said memory offset to an integer location in said message queue corresponding to said second process.

13. The computer apparatus according to claim 10, wherein said manipulating means comprises:

means for identifying a memory offset in said message list corresponding to said second process;

means for using in said second process message data at a location in said message buffer corresponding to said memory offset; and, means for releasing said message buffer.

14. The method according to claim 10, wherein said accumulated data is locked to prevent said first process from accessing said accumulated data while said accumulated data is being manipulated.

* * * * *